United States Patent [19]

Stubbs

[11] 4,227,866
[45] Oct. 14, 1980

[54] SOLAR ENERGY DEVICE

[75] Inventor: Harvard P. Stubbs, Chihuahua, Mexico

[73] Assignee: Solar Pump Corporation, Las Vegas, Nev.

[21] Appl. No.: 751,105

[22] Filed: Dec. 16, 1976

[51] Int. Cl.³ .................... F04B 17/00; F03G 7/02; F01K 11/00
[52] U.S. Cl. .................... 417/379; 60/531; 60/641; 60/669
[58] Field of Search .............. 417/379, 374; 60/531, 60/641, 398, 651, 669; 126/271

[56] References Cited

U.S. PATENT DOCUMENTS

| 142,562 | 9/1873 | Earle | 417/374 |
|---|---|---|---|
| 684,379 | 10/1901 | Ratner | 417/379 |
| 957,086 | 5/1910 | Pelletier | 60/641 |
| 1,737,248 | 11/1929 | Kelley | 417/545 |
| 1,785,651 | 12/1930 | Romagnoli | 60/641 |
| 2,413,287 | 12/1946 | Bush | 92/13.2 |
| 3,937,599 | 2/1976 | Thureau et al. | 60/641 |
| 4,038,826 | 8/1977 | Shaw | 60/641 |
| 4,094,146 | 6/1978 | Schweitzer | 60/641 |

Primary Examiner—Leonard E. Smith

Attorney, Agent, or Firm—Owen, Wickersham & Erickson

[57] ABSTRACT

A solar energy device for producing a continuous mechanical motion to drive apparatus such as a well pump comprises a frame made of conduit sections that supports a heat collector to receive the sun's rays. Heat generated within the collector is transferred to a network of conduits therein through which an evaporatable fluid is circulated as it is heated to its vaporous state. The vaporized fluid or gas is furnished to a vapor pressure motor having a common connection to the conduit network. The motor is situated within the collector and has a movable piston operated by its own valving system that produces a continuous reciprocating action. The piston is connected to an output shaft that engages a working lever arm connected to the pump. Vapor used to operate the motor is conveyed to a condenser within the frame where it is cooled to its liquid state by water produced by the well pump which is forced through the frame. An auxiliary pump attached to the condenser collects the condensed working fluid and is operable by the working lever arm to recycle it back to the collector. A combination shutoff and control valve for vaporized fluid is provided between the collector and the motor to help make the device self-starting without manipulation or auxiliary energy when the collector first becomes exposed to the sun each day.

7 Claims, 17 Drawing Figures

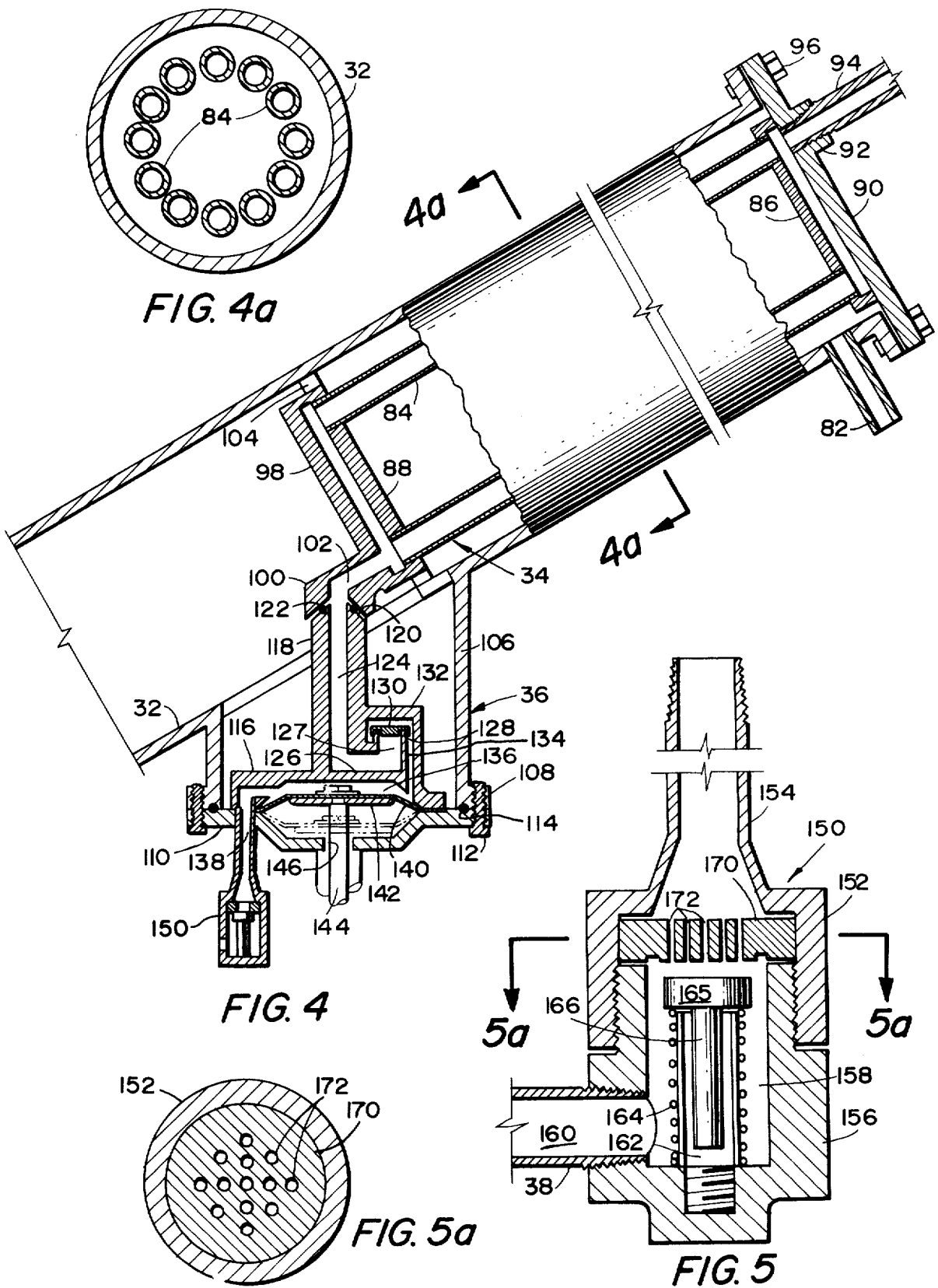

SOLAR ENERGY DEVICE

BACKGROUND OF THE INVENTION

This invention relates to mechanical apparatus operable by solar energy and more particularly to a pumping apparatus that utilizes thermal energy from the sun to activate a vaporizable fluid in a closed loop system for driving a conventional well pump.

In rural underdeveloped areas where electrical power or other conventional forms of power are either unavailable or highly expensive there has long been a critical need for a workable, efficient apparatus operable by solar power and capable of pumping water for irrigation, stock watering and other uses. One previously disclosed solar powered pumping apparatus which attempted to fulfill these requirements is described in U.S. Pat. No. 3,937,599. It utilizes a solar panel that acts as an evaporator for a vaporizable fluid used in a remote motor unit having one chamber for vaporized gas and another chamber for the water being pumped. This system requires a well with a relatively large reception chamber for retaining a separate pump. In addition, a separate reservoir of water must be provided as a cooling sump and condenser for the working fluid. The relatively large number of components and their space consuming arrangement of such prior devices tended to make them functionally impractical, relatively expensive to manufacture as well as inefficient as a workable pumping apparatus and therefore not suitable for continuous, reliable operation in remote areas.

One particular problem in providing a satisfactory solar energy apparatus prior to the present invention related to the difficulty in developing a reliable and efficient pressurized vapor motor. To operate properly such a motor must allow a quantity of pressurized vapor to enter via inlet means and to be confined within an expansion chamber on one side of the piston. After the vapor has performed its work on the piston it must be removed via outlet means as a new quantity of gas enters. During these motor operation cycles the inlet and outlet means must be opened and closed with precision and proper timing and the expansion chamber outlet must be sealed as the pressurized vapor works on the piston. The present invention provides a motor with a built in valving system that is controlled in part by movement of the piston and overcomes the aforesaid problems.

It is therefore a general object of the present invention to provide an improved solar powered pumping apparatus and one that overcomes the disadvantages of prior art devices heretofore proposed.

Another object of the present invention is to provide a solar powered pumping apparatus that is relatively compact with all of its components combined in a unique manner on a single frame structure.

Yet another object of the present invention is to provide a solar powered pumping apparatus that is easy to install and also easy to service and maintain without special tools or skilled labor.

Another object of the present invention is to provide a solar powered pumping apparatus that utilizes a unique motor located within a solar collector so as to be operable at a high level of efficiency by solar heated vapor to produce a positive reciprocating action applied to a pivotal lever arm.

Another object of the present invention is to provide a solar powered pumping apparatus wherein vapor operated motor unit located within a solar collector is operably connected to a pivotal lever arm that in turn operates a fluid pump for condensed vapor.

Another object of the present invention is to provide a solar powered pumping apparatus wherein the water being pumped is utilized to condense the vapor that was previously used in the motor unit.

Still another object of the present invention is to provide an improved vapor pressure motor with its own valve control means for producing a continuously reciprocating action requiring no lubrication.

Another object of the invention is to provide a solar powered motor apparatus including a combination on-off and check valve that will assure self starting of the vapor pressure motor whenever the sun's rays fall upon the apparatus.

Yet another object of the invention is to provide a solar powered motor in combination with a well pump jack that is particularly well adapted for ease and economy of manufacture.

SUMMARY OF THE INVENTION

The aforesaid objectives are accomplished by an apparatus comprised of a combined base and frame that supports a solar collector at an angle to the horizontal and the prevailing rays of the sun. Mounted within the collector is a motor unit operable by the vapor pressure of a vaporizable working fluid. The collector frame has a lower member that also serves as a conduit which is connectable to the discharge pipe from the cylinder of a well. The lower frame member is connected to an upper inclined conduit member that also directly supports the solar heat collector. Within the inclined frame member is a series of conduits or tubes providing fluid passes forming a condenser section for the working fluid of the motor unit. Thus, relatively cool water pumped from the well by the pump jack flows through the lower frame member and continues through the upper frame member past the work fluid condenser section.

The vapor motor unit within the collector has a reciprocating output shaft that extends through the collector and the upper frame member. The outer end of the motor unit is connected to one end of a lever arm that is pivotally mounted on a support attached to the frame. A unique valving arrangement within the motor unit causes a positive periodic cycling action by the piston. The other end of the lever arm is attached to the cylinder pump rod that extends downwardly into its well casing in the ground adjacent to the pump jack.

The working fluid is a suitable substance that is vaporizable as, for example, a refrigerant, such as a halogenated hydrocarbon commonly known under the trademark Freon. When collected in the condenser section, this fluid flows by gravity into an auxiliary pump that is also actuated by the lever arm. This latter pump forces the condensed working fluid through a check valve and up into the lower of the two headers mounted within the collector. These conduit headers are interconnected in parallel by a series of smaller conduits that are spaced apart across the inside surface of the solar heat collector. Another conduit extending from the upper header in the collector is connected through a combination manual or automatic on-off valve to the motor unit.

The motor unit has a diaphragm attached to a piston that is movable through a working stroke in response to a momentary build-up of vapor pressure applied to one side of the diaphragm. A valving system incorporated within the motor unit allows the working vapor to be exhausted through an outlet after each working stroke and through a return conduit to the condenser unit.

The apparatus is self-starting at the beginning of each day when the sun's rays strike the collector and commence to heat and vaporize the working fluid in the array of conduits between the headers. If the apparatus has not had a chance to cool off during the previous night, vapor back pressure may exist between the condenser section and the motor unit. This back pressure is neutralized by a branch conduit that applies the pressure to the back side of the diaphragm piston as well as the front side through the outlet exhaust part. The combination turn-on and check valve causes the vapor pressure buildup in the heating conduits to be applied directly to the motor unit. The latter commences its cycling operation as soon as the critical starting pressure is reached.

Other objects, advantages and features of the invention will become apparent from the following detailed description of the embodiment presented in conjunction with the accompanying drawing.

BRIEF DESCRIPTION OF THE DRAWING

FIG. 1A is a fragmentary view in section showing a typical pump jack cylinder operable by the apparatus of FIG. 1;

FIG. 4 is a somewhat enlarged fragmentary view in section of the inclined frame section for the apparatus showing the condenser and also the circulating pump for the working fluid;

FIG. 4A is a view taken in section at line 4A—4A of FIG. 4;

FIG. 5 is an enlarged view of the outlet check valve for the circulating pump;

FIG. 5A is a view in section taken at line 5A—5A of FIG. 5;

DETAILED DESCRIPTION OF EMBODIMENT

Figure 1:
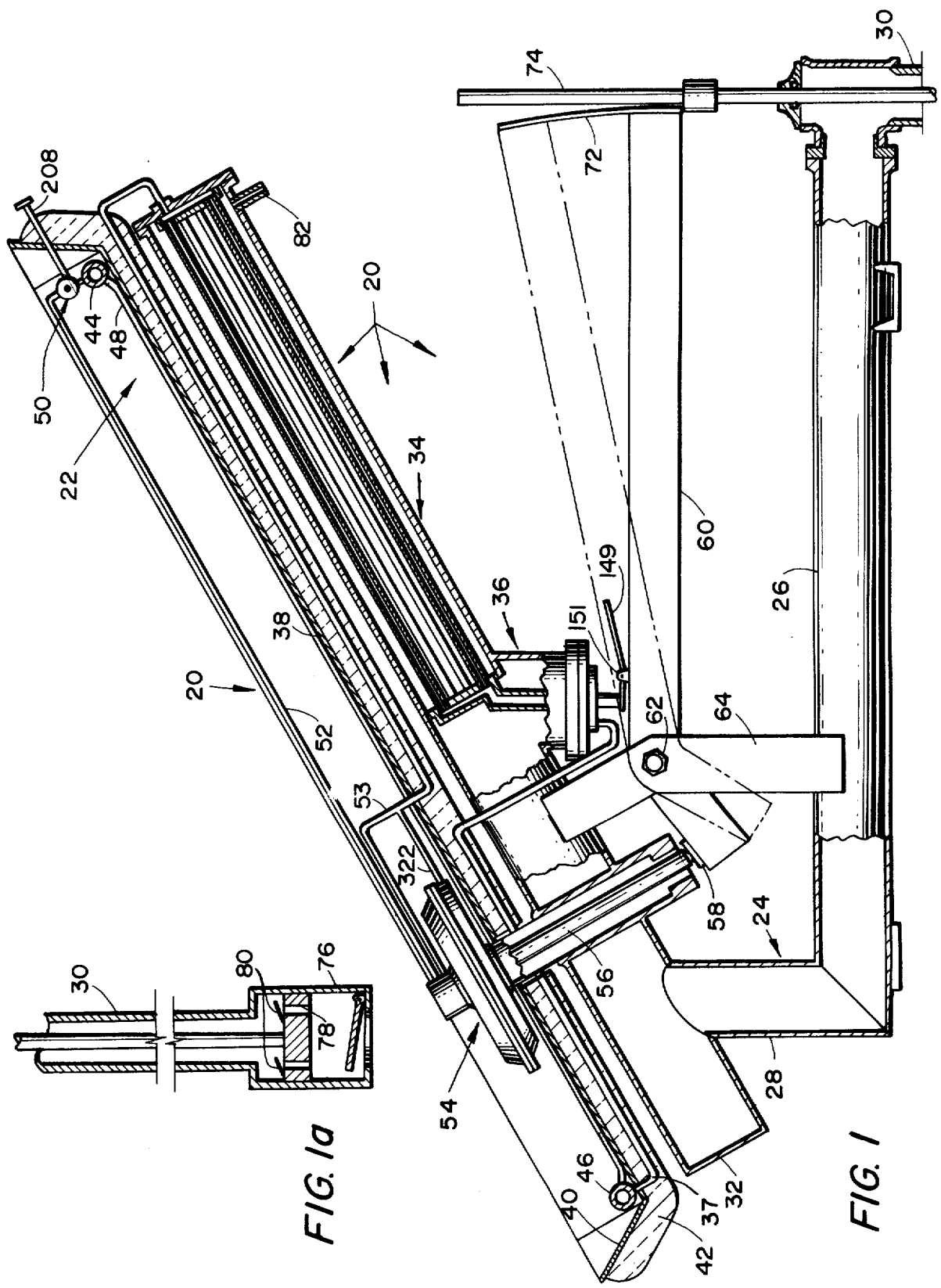
FIG. 1 is a view in elevation and partially in section showing a solar energy apparatus according to the present invention.

With reference to the drawing, FIG. 1 shows a solar energy device 20 embodying the principles of the present invention and particularly adapted to operate a reciprocating well pump. In broad terms the device comprises a solar heat collector 22 that is supported by a frame 24 so that it is maintained in an inclined position that will normally intercept the sun's rays during daylight hours. The frame may be supported on a fixed foundation with the collector positioned to achieve the most effective solar heating, or it may be mounted on a track so as to be movable and thereby capable of tracking the sun for more efficient use.

In the configuration shown, the frame is comprised of a lower horizontal section 26 that is connected at one end to a vertical section 28. The other end of the horizontal section is connected to a discharge pipe 30 associated with a conventional well (see FIG. 1a). The vertical frame section is connected to an inclined frame section 32 that is located directly under the collector. All frame sections are hollow so that water can flow through them from the well discharge pipe 30. Within the upper portion of the inclined frame section is a vapor condenser 34 for a vaporizable working fluid that is confined in a closed loop system of the device. At its lower end, this condenser feeds fluid to an auxiliary pump 36 whose outlet is connected through a conduit 37 to the collector.

Figure 2:
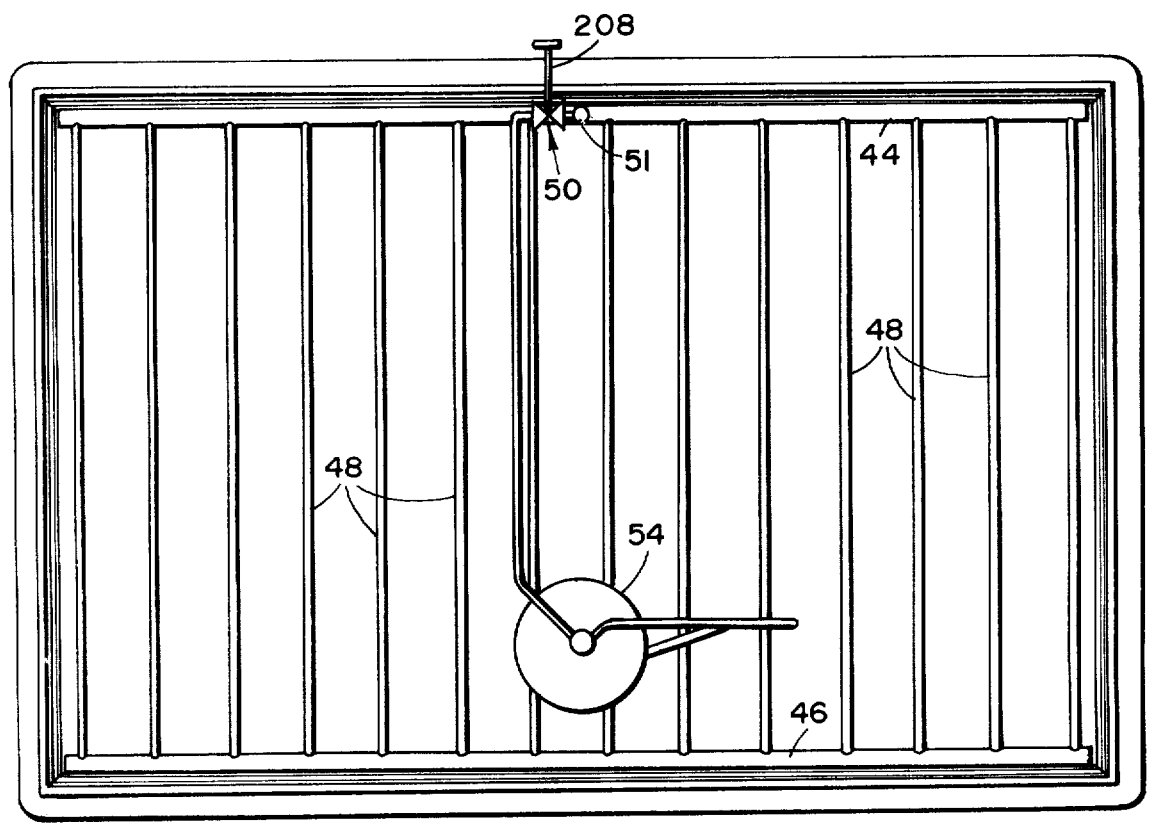
FIG. 2 is a top view of the apparatus of FIG. 1 showing the collector and motor unit.

The collector 22, as shown in FIGS. 1 and 2, is essentially a planar base member 38 having a rectangular shape and made of sheet metal or some suitable material, and surrounded by a continuous wall portion 40. This wall is preferably flared outwardly around its perimeter to prevent any shadowing in the bottom surface of the base member. An outer layer 42 of insulating material such as polyurethane is bonded to the outer surfaces of the wall and base portions. The inside surfaces of the collector are all coated with a black, heat-absorbing material such as a suitable dull black paint. Within the collector is an upper header 44 and a lower header 46 that is parallel to the upper header and located along the bottom edge of the planar base member. The headers are interconnected by a plurality of smaller conduits 48 that are arranged in spaced apart and parallel order to form a network that exposes a relatively large area of conduit surfaces to the heated bottom surface of the collector. Working fluid supplied from the auxiliary pump to the lower header 46 flows through the conduits 48 to the upper header 44 as it is progressively heated and vaporized within the collector. This arrangement wherein the working fluid is supplied to the lower header comprises a particularly effective and efficient means for heating and vaporizing the fluid.

Attached to the upper header 44 is a combination on-off control and check valve 50 and a sight glass 51 to allow an observer to visually check the vapor state of the fluid in the upper header. The outlet of the valve 50 is connected by a conduit 52 to a vapor motor unit 54. This motor unit, which is operable by vapor pressure, is also mounted within the collector 22, and it has a reciprocating output piston or shaft 56 that extends through the collector base 38 and through the inclined frame section 32.

Figure 3:
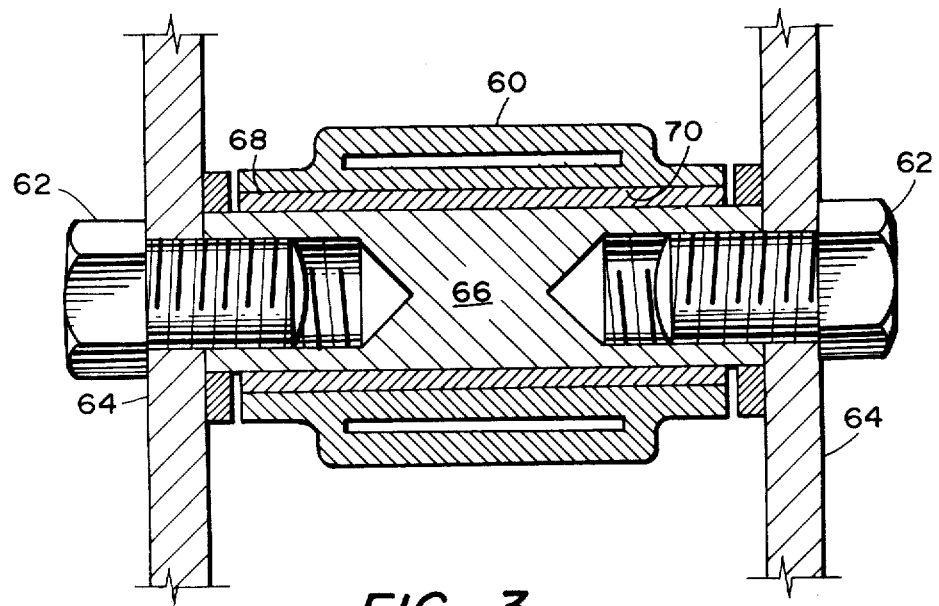
FIG. 3 is an enlarged view in section taken at line 3—3 of FIG. 1 and showing the pivotal mounting for the lever arm.

The lower end of the motor shaft engages a contact pad 58 on the short end of a pivotal lever arm 60. This arm is supported by a pair of pins 62 journaled in a pair of brackets 64 that are attached to the horizontal frame section 26 and inclined frame member 32. As shown in FIG. 3, the pins 62 are axially aligned in bore holes in the brackets 64 and are threaded into opposite ends of a pivot shaft 66. This shaft extends through a bushing 68 fixed in a transverse bore hole 70 of the lever arm.

In a typical installation of the device 20, as shown, the long end of the lever arm is attached by a flexible band 72 to the pump rod 74 of a conventional pump. As shown in FIG. 1A, the pump discharge pipe 30 extending downwardly to a point below the water level, connects to a cylinder 76 at its lower end within which a pump piston 78 is movable. Conventional one-way valves 80 are provided on the pump piston so that as it moves downwardly by gravity on its downward stoke, water flows from the bottom section through the piston and into the upper section of the pump cylinder. When the pump rod 74 and thus the pump piston 78 is pulled upwardly by the lever arm 60 a column of water is lifted and forced through the hollow frame 24 and ultimately through its outlet 82 at the end of the inclined frame member.

Certain of the important components of the device 20 will now be described in greater detail in conjunction with specific drawings.

THE WORKING FLUID CONDENSER

The condenser 34, shown on FIGS. 1 and 4, is located within the inclined frame section 32 and comprises a series of relatively small conduits or tubes 84 that extend parallel to its axis and are attached at opposite ends to transverse supports 86 and 88. The support 86 at the upper end of the inclined frame section is fixed to an end plate 90 having an inlet fitting 92 that receives the end of a conduit 94 from the vapor motor. The end plate is held to an end flange on the inclined frame member by a series of machines bolts 96. Thus, exhausted gas from the motor is furnished to the upper ends of all of the condenser tubes 84. The lower support 88 for the condenser tubes is fixed to a collector plate 98 having a lower portion 100 forming a single outlet 102 for liquified working fluid that has condensed in the tubes. Both upper and lower tube supports have spaces 104 inside the walls of the inclined frame section that allow water to flow axially past and around the condenser tubes so as to cool and condense the exhaust gas. After flowing through this condenser section the water exits from the inclined frame member through the outlet 82 from whence it can be piped to any desired location.

WORKING FLUID PUMP

Fixed to and extending vertically downwardly from the underside of the inclined frame section 32 is an outer housing 106 for the working fluid pump 36. This housing has a flange 108 at its lower end that provides a seat for a removable end plate 110 that may be held in place by removable machine screws 112. An O-ring 114 is seated in matching grooves of the flange and end plate to provide a fluid-tight seal.

An inner housing 116 for the liquid pump has an upright inlet portion 118 with a tapered end surface 120 that fits within and against a matching conical surface on the condenser outlet 100. An O-ring 122 is provided between these two conical surfaces to provide another fluid tight seal. The inlet portion of the inner housing has a passage 124 that extends downwardly to a transverse plate portion 126 and then laterally and upwardly to terminate at an opening 127 with an annular lip 128. The latter provides a seat for a movable valve member 130 which is surrounded by a portion 132 of the inner housing 116. This valve member has a shape that is similar to but somewhat larger than the annular lip 128 and a continuous groove within which it will fit when the valve member is closed. A passage 134 extends downwardly within the inner housing into one side of a chamber 136 on the opposite side of which is an outlet conduit 138 that extends through the outer housing end plate 110. Extending across the chamber 136 is a flexible diaphragm 140 to the underside of which is fixed a rigid plate 142. The latter is connected by a locking nut to a push rod 144 which extends downwardly through an opening 146 in the end plate of the outer housing. The lower end of the push rod engages the lever arm 60 of the machine so that on each upward stroke of the lever arm the push rod and hence the diaphragm 140 is moved upwardly to decrease the volume of the chamber 136 and force fluid through its outlet 138. Any fluid that might tend to be forced back through the inlet 134 merely causes the valve member 130 to close the opening 127 and thereby act as a check valve.

To facilitate manual operation of the pump 36 when the lever arm is not being actuated, a small hand lever 149 pivoted about a bearing 151 on the lever arm 60 is fixed to the push rod 144. Thus, working fluid can be pumped to the lower header whenever necessary even when the motor is not operating.

As shown, the pump outlet 138 is connected to another check valve 150, which is shown in greater detail in FIG. 5. This latter valve comprises an upper housing section 152 having an inlet nipple 154 threaded into the end plate outlet 138. A lower housing section 156 threaded to the upper section has central chamber 158 with a side outlet opening 160 at its lower end for the conduit 38 that carries fluid to the collector. Fixed to the lower end of the housing section 156 is a sleeve 162 around which is a coiled spring 164. Slidable within the sleeve is the stem of a mushroom valve member 166 having an enlarged upper end portion 168. Retained in the upper housing section 152 by the upper end of the lower section is a disc 170 having a plurality of ports 172. When fluid is forced to flow from the pump 36 by its diaphragm 140 through the outlet 138 the mushroom valve 168 is pushed downwardly from the disc 170 to allow fluid flow through the ports 172. However, without fluid pressure from the pump 36, the ports are closed by the valve member 168 to prevent reverse fluid flow from the conduit 38.

THE ON-OFF CONTROL VALVE

The combination on-off control and check valve 50 controls the flow of compressed or liquified gas from the heat collector 22 to the motor 54. It is capable of being manually operable to shut off completely the flow of vaporized fluid from the collector to the motor or being operable automatically to self start the motor each day when the sun creates sufficient heat in the collector to vaporize the fluid. It provides for an initially high threshold pressure, higher than operating pressure, to start operation of the motor.

Figure 6A:
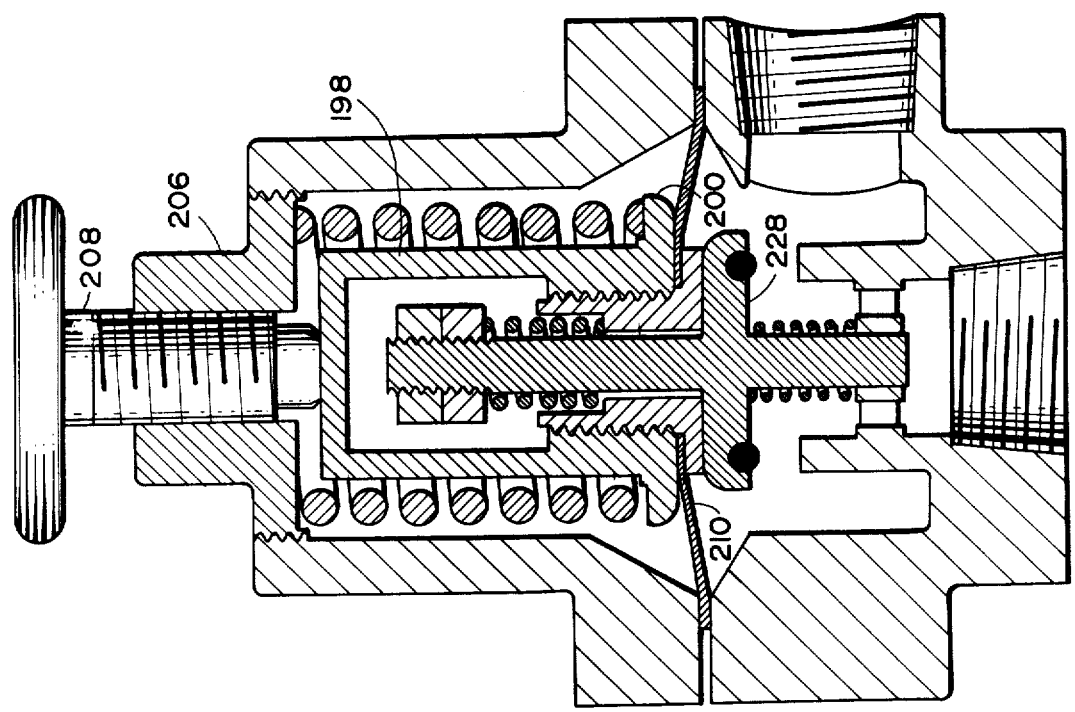
FIG. 6A is a view similar to FIG. 6 showing the valve in the open position.
Figure 6:
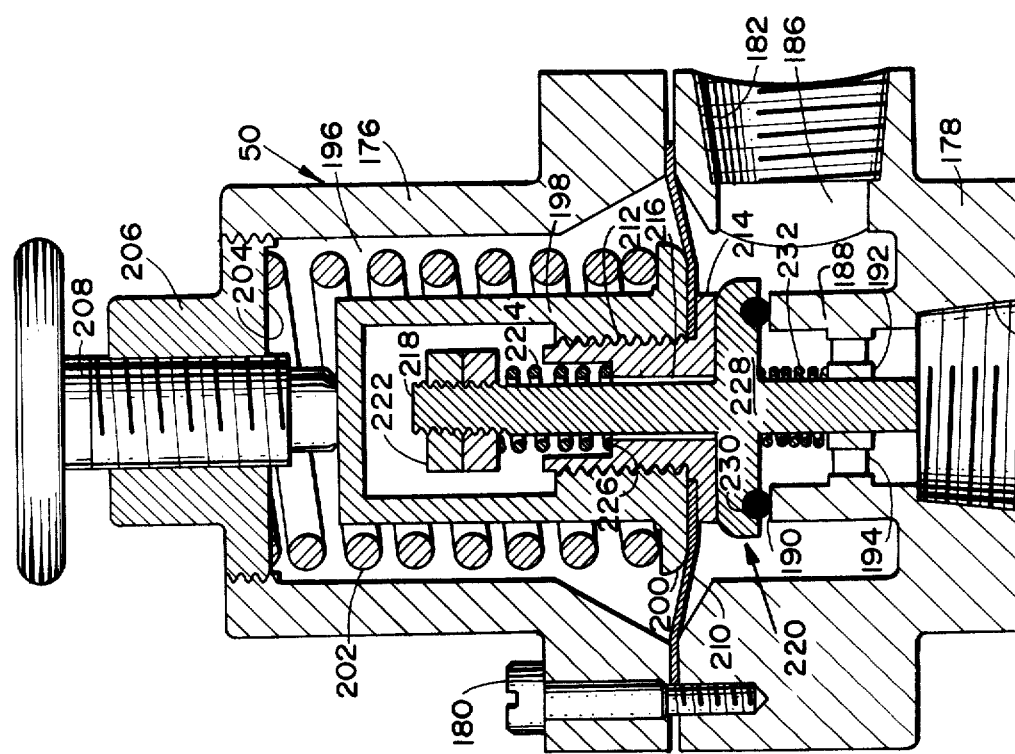
FIG. 6 is a view in elevation and in section showing the control check valve for the apparatus of FIG. 1, in the closed position.

As shown in FIGS. 6 and 6A, this valve comprises mating upper and lower housings 176 and 178 held together by a series of machine screws 180 that extend through adjacent flange portions of the housings. The lower housing 178 has an inlet 182 extending through a sidewall and a similarly sized outlet 184, both of which are threaded to receive the ends of appropriately sized conduits. The inlet 182 communicates with an internal chamber 186 formed around an annular boss portion 188 having an annular valve seat 190. This boss portion supports a transverse annular member 192 between its ends having a series of openings 194 which communicate with the outlet 184.

The upper housing 176 has a generally cylindrical chamber 196 within which is a movable hollow valve member 198. The latter has a radially extending flange 200 at its lower end which bears against one end of a heave spring 202. This spring, which is coiled around the valve member 198 is restrained at its other end by the end wall 204 of a boss portion 206 forming the chamber 196. Threaded in the boss portion 206 that extends outwardly from the housing end wall is an adjustable control rod 208 having a turn handle on its outer end. The boss portion 206 is threaded into the upper housing 176 so that its axial position can be adjusted to vary the tension on the heave spring 202. The inner end of this rod bears against the end of the valve member to adjust its axial position within the chamber 196, or to close the valve completely, as shown in FIG. 6. A flexible diaphragm 210 of some suitable material such as a reinforced elastomer has an annular shape and is retained at its outer edge between the adjacent housing flanges. A housing nut 212 having a cylindrical shape is threadedly secured in the lower end of the valve member. The lower end of this nut has an end flange 214 that retains the inner edge of the diaphragm 210 against the lower end flange 200 of the hollow valve member 198. Through a central bore 216 of the housing nut extends an upper guide portion 218 of a valve member 220. This upper valve guide portion extends into the adjustable hollow valve member 198 and its end is threaded to a stop nut 222. One end of a second relatively small spring 224 around the valve guide is retained by this stop nut and the other end of the spring is retained against an internal shoulder 226 of the housing nut.

The valve member 220 has a central, circular portion 228 with a planar underside having an annular groove for a flexible sealing ring 230. With the valve member in its closed position, the sealing ring bears against the annular internal valve seat 190 of the lower housing.

The diaphragm 210 confines the vapor entering the inlet to the chamber 186 of the lower housing and this vapor pressure exerted against the diaphragm 210 tends to move the valve member 198 (once the control rod 208 has been retracted) and compress the heave spring 202. The valve remains closed through the initial movement, since pressure acts between the flange 214 and the portion 228 to separate the two, pushing down on the portion 228 and up on the flange 214 and the diaphragm 210. After a certain amount of movement of the valve member 198 the smaller spring 224 is compressed between the end of housing nut 212 and the stop nut 222 on the valve stem portion sufficiently to overcome the effect of pressure acting on the portion 228. This causes the valve portion 228 and its sealing ring 230 to move away from its seated position on the annular seat 190, thereby initially opening the path for fluid to pass from the inlet to the outlet. As soon as this initial opening is accomplished a pressure drop occurs in the chamber 186, and pressure on the two sides of the portion 228 becomes equalized, allowing the valve portion 228 to snap open under the influence of the spring 224 and a smaller spring 232 to fully open the valve and thereby allow maximum flow of fluid. Thus, a high threshold pressure is required to build up to open the valve initially, but the valve remains open at a lower operating pressure. The valve automatically closes when the pressure within chamber 186 drops sufficiently to allow the heave spring 202 to move the diaphragm and the valve members 198 and 220 downwardly to engage the sealing ring 230 against the seat 190.

In normal operation the control rod 208 is retracted so as to allow for axial movement of the hollow valve member 198 within the chamber 196. As shown in FIG. 6, when the device 20 is desired to be in an "off" mode, the handle of the control rod 208 is turned so that its inner end presses firmly against the hollow valve member and thus prevents it and the valve member 220 from moving, thereby keeping the latter closed and blocking any flow through the valve 50. With the control rod retracted, as shown in FIG. 6A, the valve members 198 and 220 are free to move when the vapor pressure reaches its critical operating level whereupon the valve operates as described.

THE VAPOR MOTOR

Figure 7:
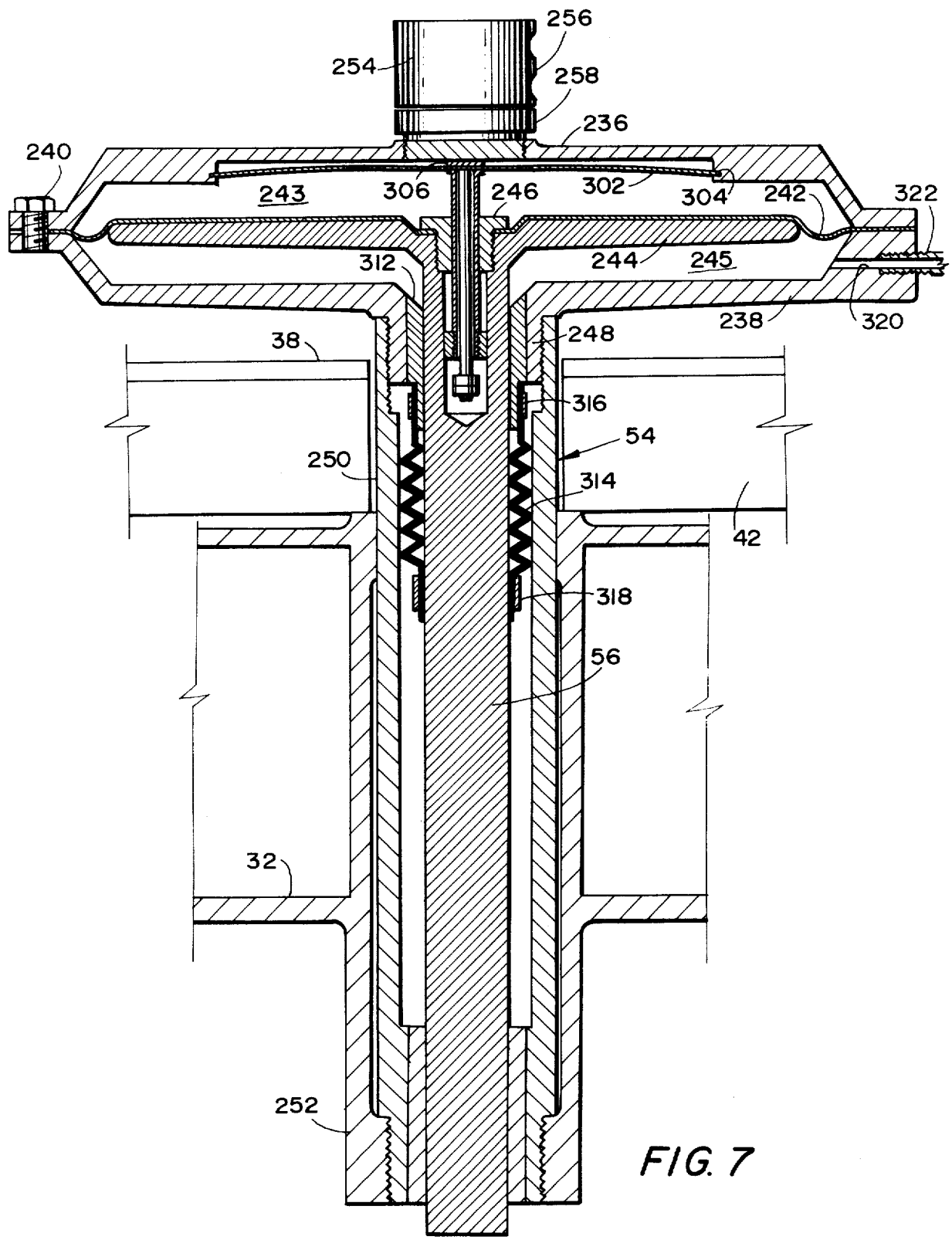
FIG. 7 is an enlarged view in section showing the vapor motor unit according to the present invention.

As shown in FIG. 7, the reciprocating vapor motor 54 which is situated within the collector 22 comprises upper and lower concave housing sections 236 and 238 both of which have a generally circular shape with adjacent edge flanges that are held together by a series of circumferentially spaced apart bolts 240. Retained between these edge flanges is the outer edge of a flexible, circular diaphragm 242 made of some suitable material such as a reinforced elastomer. This diaphragm extends over a circular end plate 244 attached to the inner end of the motor shaft 56. Thus, the diaphragm and the end plate form upper and lower chambers 243 and 245 between the two housing sections. A retaining nut 246 at the center of this end plate is threaded into the end of the motor shaft and has a flange which retains and seals an inner circular edge of the diaphragm.

The lower housing section 238 has a threaded boss portion 248 with a bore through which the motor shaft extends, and this boss portion is attached to a cylindrical sleeve 250 that extends through the bottom of the collector. The lower end of this sleeve extends through the inclined frame member 32 and is threaded to a branching boss portion 252 of this frame member.

Figure 8:
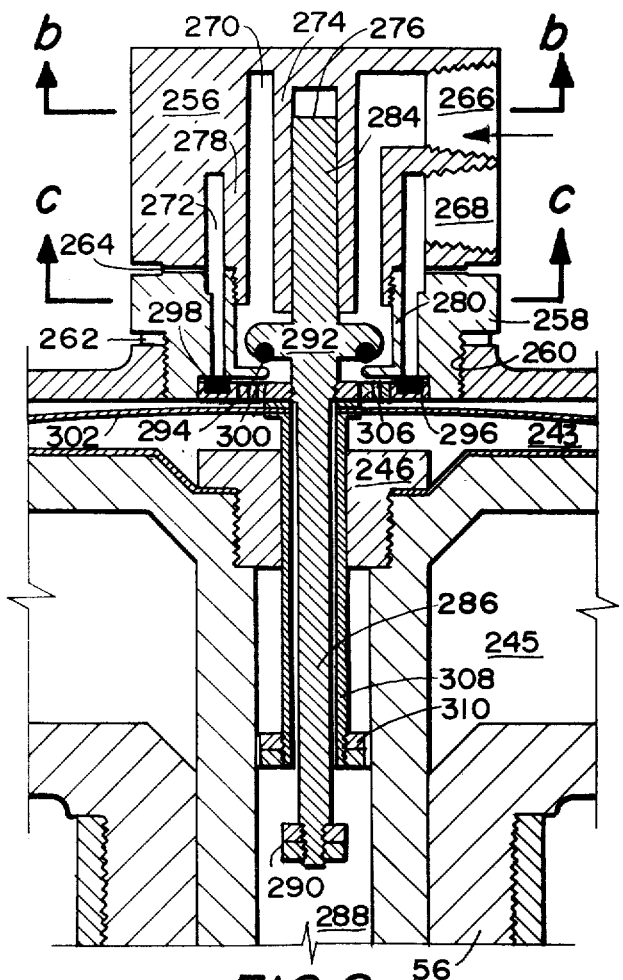
FIG. 8 is a further enlarged fragmentary view in section showing the motor unit with its vapor inlet open before the working stroke of the piston.

Attached to the upper housing section 236 of the motor 56 is a valve control housing 254 comprised of upper and lower sections 256 and 258. As shown in FIG. 8, the lower valve housing section has an axial bore and is threaded into a central opening 260 in the upper motor housing. An outer flange on this lower valve housing section presses against a compressible gasket 262 around the central opening of the upper motor housing to provide a fluid tight seal for the valve housing. The upper valve housing section is secured to the lower valve housing section by a series of threads 263 and a suitable sealing gasket 264 is provided between their engaging surfaces. This upper valve housing section has inlet and outlet ports 266 and 268, both of which are threaded in the usual manner to receive the ends of conduits. The inlet conduit 52 provides pressurized vapor to the motor from the valve 50 and the outlet conduit 53 returns the used vapor to the condenser 34. Internally, the upper valve housing section 256 has an inner annular recess 270 that communicates with the inlet port 266 and an outer annular recess 272 that communicates with the outlet port 268.

The inner annular recess is formed by an integral first sleeve portion 274 that extends downwardly from the top of the upper valve housing section and also provides a guide for a movable control valve member 276. Between the inner and outer annular recess 270 and 272 is a second sleeve portion 278 that is concentric with and spaced outwardly from the first sleeve portion 274. Threadedly attached to the lower end of this second sleeve portion is an annular sleeve extension 280 with an end flange 282 that forms a two-way closure ring for the movable valve member.

The movable valve member 276 has an elongated rod-like configuration with an upper stem portion 284 that extends with a sliding fit into the first sleeve portion 274 of the valve housing. A lower elongated valve portion 286 extends downwardly through the diaphragm locking nut 246 and into a recess 288 in the upper end of the motor shaft 56. A stop nut 290 is threadedly attached to the lower end of the lower valve portion. Between the upper and lower valve portions is an integral, circular shaped valve body 292 which extends generally perpendicular to the longitudinal axis of the valve member 276. This valve body is located within and has a diameter somewhat less than the sleeve extension 280 so that vapor can flow around its periphery. On the underside of the valve body is a groove that retains an annular sealing ring 294 of flexible material such as rubber or neoprene.

Spaced below the integral valve body 292 and threaded to the lower valve portion 286 is a circular valve member 296, having a larger diameter than the valve body. This latter valve member has a groove near its outer edge that retains a sealing ring 298 of flexible, elastomeric material (See FIG. 8E). This latter sealing ring has an outer diameter somewhat greater than an inner diameter and somewhat less than the outer diameter of the sleeve extension 280. Spaced radially inwardly from the sealing ring on the valve member 296 are a series of circumferentially spaced apart ports 300 that are aligned generally beneath the end flange of the sleeve extension.

Attached to the motor control valve 276 and to the motor housing is a spring 302 which positions the valve to achieve the desired motor operation. In the embodiment shown, this spring comprises a rectangular sheet of resilient metal having the desired thickness and elasticity characteristics so as to provide the well known oil can type flexing action as it moves from a concave to a convex configuration when restrained around its outer edge. Within the motor, the outer edge of the sheet spring 302 is restrained by a groove 304 in the upper housing section. At its center, the rectangular sheet spring is spaced downwardly from the valve port ring 296 by a washer 306 and is held thereto by the flange of a sleeve 308 that extends downwardly with a slidable fit through the diaphragm locking nut 246. Attached to the lower end of the sleeve 308 is a collar 310 that provides a means for limiting the travel of the valve member 276 and the sheet spring 302.

The motor shaft 56 is supported by and slidable with a bushing 312 of a suitable bearing material that is retained on the inside of the boss portion 248 on the lower housing 238. This bushing is sized to form a close sliding fit with the motor shaft 56. At its lower end the bushing has reduced outside diameter around which is the upper end of a bellows-like sealing member 314, retained on the bushing by a band or clamp 316. The bellows member extends downwardly around the shaft 56 and its lower end is secured thereto by another clamp 318. Thus, the bellows sealing member prevents leakage of vaporized working fluid from the lower motor chamber 245.

Figure 8A:
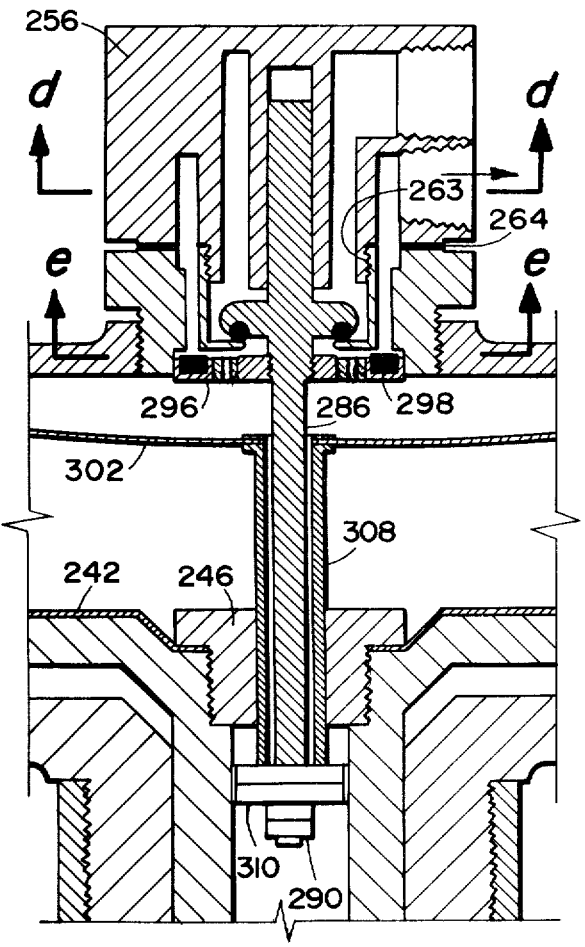
FIG. 8A is a view in section similar to FIG. 7 showing the motor unit with its vapor outlet open after the working stroke of the piston.
Figure 8B:
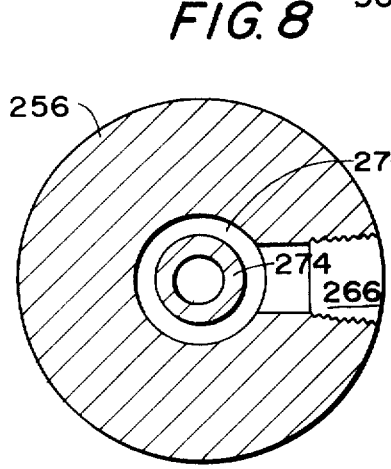
FIG. 8B is a view in section taken at line 8B—8B of FIG. 8.
Figure 8E:
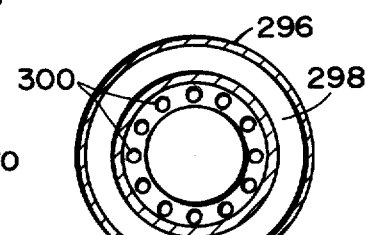
FIG. 8E is a view in section taken at line 8E—8E of FIG. 8A.
Figure 8C:
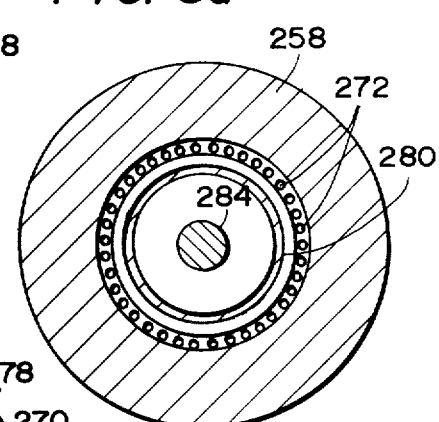
FIG. 8C is a view in section taken at line 8C—8C of FIG. 8.
Figure 8D:
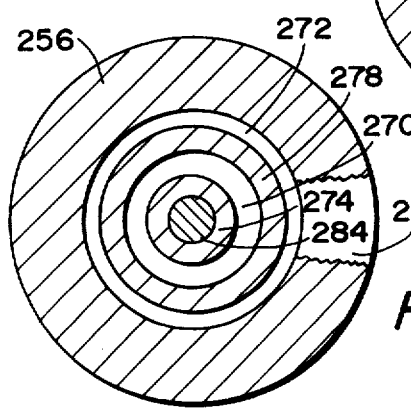
FIG. 8D is a view in section taken at line 8D—8D of FIG. 8A.

The operation of the reciprocating motor 54 may be best described by reference to FIGS. 8 and 8A. When the working fluid vaporized by the heat within the collector 22 passes through the control valve 50 it travels through conduit 52 and enters the inlet port 266 of the motor and into the inner annular recess 270. When the sheet spring 302 pushes the valve member 276 to its uppermost position, the pressurized gas flows around and under the integral valve member and through the ports 300 of the circular valve member 296 (See FIG. 8). Since the sheet spring is rectangular the pressurized gas quickly flows around it and fills the chamber 243 of the motor on the upper side of the diaphragm. Thus, when gas fills this chamber, its pressure is acting on the full area of the diaphragm 242 and sufficient total force is produced to move the diaphragm and its attached piston. As the piston moves downwardly through its operating stroke it ultimately reaches the point where the lower end of the diaphragm nut 246 strikes the collar 310 on the spring sleeve 308. When this occurs the spring sleeve and hence the spring itself, move downward until the collar engages the stop nut 290 on the lower end of the lower valve portion (See FIG. 8A). This moves the integral valve portion 292 downwardly until its sealing ring 294 engages the inside of the end flange 282 of the sleeve extension 280. As this occurs the incoming vapor flow path is closed and the lower valve ring 296 is moved away from the flange 282 of the sleeve extension to provide an outgoing flow path into the outer annular recess 272 and through the motor outlet port 268. As vapor flows out of the chamber a short period of time elapses before the pressure on the diaphragm is released to allow upward movement of the motor shaft on its return stroke. When this occurs, the sheet spring 302 is allowed to push the valve member 276 back upwardly to close the outflow path from the upper chamber 243 and therefore put the valve in position to start another cycle.

As shown in FIG. 7, the lower housing 238 is provided with port 320 that is threaded to receive a conduit 322. This conduit is connected to the conduit 53 which extends to the condenser 34. Thus, any vapor back pressure created in condenser 34, due to inadequate cooling at night, will be supplied equally to both upper and lower chambers 243 and 245, on opposite sides of the diaphragm in the vapor motor 54.

From the foregoing it should be apparent that the present invention comprises a unique combination and arrangement of components including a highly efficient vapor motor forming an effective solar energy powered pumping device. When installed at some remote location the device will self start each day and operate completely unattended. Although particularly adaptable for use in combination with a pump jack for pumping water at remote stations, the mechanical output which the device produces could also be utilized in other applications.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A solar energy powered pumping device, comprising:
- a panel-type solar collector for receiving and concentrating heat from the sun's rays including an outer enclosure;
- means providing an array of conduits adapted to carry a vaporizable working fluid within the enclosure of said collector and to absorb the collected heat, said conduits having a common inlet and a common outlet;
- a vapor pressure actuated motor means located within the enclosure of said collector, said motor means having a reciprocating drive shaft extending from said collector and connected to a vertical reciprocation, sucker rod type well pump, and including a mechanical linkage means connecting the motor drive shaft to a reciprocating shaft of the well pump;
- motor means having control means connected to said common outlet for receiving and exhausting vaporized fluid;
- frame means supporting said collector;
- condenser means supported by said frame means for receiving vapor exhausted from said motor means and condensing it to its liquid form for recycling to said collector;
- working fluid pump means attached to said condenser means for supplying condensed fluid to said common inlet for said conduits in said collector; and
- means for delivering water from the well pump through said condenser for condensing vaporized fluid therein, including hollow structural support members of said frame means, defining a conduit connected to the well pump and to the condenser, said condenser being inclined and including an outlet at its upper end for pumped water.

2. A solar energy device for producing a continuous mechanical motion comprising:
- a panel-type solar collector for receiving and concentrating heat from the sun's rays including an outer enclosure;
- means providing an array of conduits adapted to carry a vaporizable working fluid within the enclosure of said collector and to absorb the collected heat, said conduits having a common inlet and a common outlet;
- a vapor pressure actuated motor means located within the enclosure of said collector, said motor means having a reciprocating drive shaft extending from said collector and connected to a work load, said motor means having control means connected to said common outlet for receiving and exhausting vaporized fluid;
- a control valve means between the common outlet of said collector conduits and said motor means, for admitting vaporized fluid to the motor means only upon the attainment of an initial preselected high pressure level in the conduits, for starting of the device in the morning, thence remaining open so long as pressure remains above a preselected lower pressure, for operation of the device during the day;
- frame means supporting the collector;
- condenser means supported by said frame means for receiving vapor exhausted from said motor means and condensing it to its liquid form for recycling to said collector; and
- working fluid pump means attached to said condenser means for supplying condensed fluid to said common inlet for said conduits in said collector.

3. A solar energy powered pumping device comprising:
- a panel-type solar collector for receiving and concentrating heat from the sun's rays, including an outer enclosure;
- means providing an array of conduits adapted to carry a vaporizable working fluid within the enclosure of said collector, and to absorb the collected heat, said conduits having a common inlet and a common outlet;
- a motor means operable by a vaporized working fluid and located within the enclosure of said collector, said motor means having a reciprocating drive shaft extending from said collector and control means connected to said common outlet for receiving vaporized working fluid, and said motor means including a housing within the collector, a movable diaphragm within the housing that forms upper and lower chambers therein, and a piston having a head portion fixed to the diaphragm and connected to the drive shaft, said control means having an inlet for receiving vaporized fluid under pressure within the upper housing and an outlet conduit to said condenser for releasing the vaporized fluid after movement of the piston;
- frame means supporting the collector;
- condenser means supported by the frame means for receiving vaporized working fluid exhausted from said motor means and condensing it to its liquid state for recycling to the collector;
- conduit means interconnecting the lower chamber of the motor means with the outlet conduit to the condenser means for eliminating the effect of back pressure from said condenser on said diaphragm and piston;
- working fluid pump means attached to the condenser means for supplying condensed working fluid to the common inlet for the array of conduits in the collector;
- a lever arm supported for pivotal movement on said frame means and having an inner end in contact with the drive shaft of said motor means, said lever arm comprising a pump jack of a well pump having a buried casing with a discharge pipe and a cylinder within said casing connected to a pump rod;
- means for connecting an outer end of said lever arm to said pump rod; and
- means for conveying water from said discharge pipe through said condenser.

4. A solar energy powered pumping device comprising:
- a panel-type solar collector for receiving and concentrating heat from the sun's rays, including an outer enclosure;
- means providing an array of conduits adapted to carry a vaporizable working fluid within the enclosure of said collector, and to absorb the collected heat, said conduits having a common inlet and a common outlet;
- a motor means operable by a vaporized working fluid and located within the enclosure of said collector, said motor means having a reciprocating drive shaft extending from said collector and control means connected to said common outlet for receiving vaporized working fluid;

frame means supporting said collector;

condenser means supported by said frame means for receiving vaporized working fluid exhausted from said motor means and condensing it to its liquid state for recycling to said collector;

working fluid pump means attached to said condenser means for supplying condensed working fluid to said common inlet for said array of conduits in said collector;

a lever arm supported for pivotal movement on said frame means and having an inner end in contact with said drive shaft of said motor means, said lever arm comprising a pump jack of a well pump having a buried casing with a discharge pipe and a cylinder within said casing connected to a pump rod;

means for connecting an outer end of said lever arm to said pump rod; and said frame means including a lower horizontal frame member supporting said lever arm and an inclined frame member supporting said collector above said lower frame member, and further including hollow structural support members defining a conduit connected to the discharge pipe of the well pump and to the condenser means for passing pumped water through the condenser means to cool and condensing the working fluid, said condenser means including a pumped water outlet for discharging the pumped water.

5. A solar energy powered water pumping device, comprising:

a collector for receiving and concentrating heat from the sun's rays;

frame means supporting the collector;

means providing conduits adapted to carry a vaporizable working fluid within the collector, said conduits having a common inlet and a common outlet;

a vapor pressure actuated motor located within said collector, said motor having a reciprocating drive shaft connected to a work load and having valving control means connected to the common outlet for receiving and exhausting vaporized fluid;

a condenser supported by the frame means for receiving vapor exhausted from the motor and condensing it to its liquid state for recycling to the collector, said condenser including an enclosure for water cooling of the condenser;

a working fluid pump connected to the condenser and to the common inlet supplying condensed fluid to the common inlet for circulation through the conduits in the collector;

first mechanical linkage means connecting the motor drive shaft with the working fluid pump for driving the working fluid pump by the reciprocating motion of the drive shaft;

a water pump connected to a source of water to be pumped; and second mechanical linkage means connecting the motor drive shaft with the water pump for actuating the water pump by the reciprocating motion of the drive shaft;

said frame means including hollow structural support members defining a conduit connected to the water pump and to the condenser enclosure, with a water outlet in the enclosure, whereby water pumped by the solar powered pumping device cools and condenses the working fluid for the motor.

6. A solar energy powered pumping device comprising:

a panel-type solar collector for receiving and concentrating heat from the sun's rays, including an outer enclosure;

means providing an array of conduits adapted to carry a vaporizable working fluid within the enclosure of said collector, and to absorb the collected heat, said conduits having a common inlet and a common outlet;

a motor means operable by a vaporized working fluid and located within the enclosure of said collector, said motor means having a reciprocating drive shaft extending from said collector and control means connected to said common outlet for receiving vaporized working fluid;

frame means supporting said collector;

condenser means supported by said frame means for receiving vaporized working fluid exhausted from said motor means for condensing it to its liquid state for recycling to said collector;

working fluid pump means attached to said condenser means for supplying condensed working fluid to said common inlet for said array of conduits in said collector;

a control valve connected between the common outlet of the conduits and said control means of the motor means, for controlling the operating status of said motor means, said control valve including means for starting the motor means by remaining closed until an initial high pressure builds up in the conduits, thence remaining open at a lower operating pressure;

a lever arm supported for pivotal movement on said frame means and having an inner end in contact with said drive shaft of said motor means, said lever arm comprising a pump jack of a well pump having a buried casing with a discharge pipe and a cylinder within said casing connected to a pump rod;

means for connecting an outer end of said lever arm to said pump rod; and means for conveying water from said discharge pipe through said condenser means.

7. The pumping device described in claim 6, further including manually controllable means for shutting off the valve and the flow of working fluid through the device.

* * * * *